United States Patent [19]

Attilio

[11] Patent Number: 5,235,170

[45] Date of Patent: Aug. 10, 1993

[54] APPARATUS AND PROCESS FOR MAGNETICALLY AND OPTICALLY READING DOCUMENTS AND SELECTING THE SAME

[76] Inventor: Piazza Attilio, Via Vanvitelli 46, Milan, Italy

[21] Appl. No.: 879,501

[22] Filed: Apr. 27, 1992

[51] Int. Cl.⁵ .............................. G06K 13/07
[52] U.S. Cl. ........................ 235/475; 235/483
[58] Field of Search ............ 235/449, 475, 476, 483, 235/484; 271/198, 199; 382/7

[56] References Cited

U.S. PATENT DOCUMENTS

| | | | |
|---|---|---|---|
| 3,683,943 | 8/1972 | De Crepy | 271/199 X |
| 4,228,953 | 10/1980 | Ingram et al. | 235/475 X |
| 4,260,879 | 4/1981 | Galatha et al. | 235/475 X |
| 4,288,688 | 9/1981 | Kiyama et al. | 235/475 X |
| 4,377,828 | 3/1983 | Hayman et al. | 235/475 X |

FOREIGN PATENT DOCUMENTS

| | | | |
|---|---|---|---|
| 0291473 | 11/1988 | European Pat. Off. | |
| 168188 | 10/1983 | Japan | 235/449 |

Primary Examiner—F. L. Evans
Attorney, Agent, or Firm—Helfgott & Karas

[57] ABSTRACT

In an apparatus for magnetically or optically reading documents and selecting the same, a belt following a closed, continuous, U-shaped path transfers a document from a sending slot to a receiving slot chosen by a computer unit housed in the apparatus body.

11 Claims, 6 Drawing Sheets

APPARATUS AND PROCESS FOR MAGNETICALLY AND OPTICALLY READING DOCUMENTS AND SELECTING THE SAME

This is a continuation of application Ser. No. 521,045, filed May 9, 1990, now abandoned.

BACKGROUND OF THE INVENTION

This invention refers to an apparatus and a process for magnetically or optically reading documents such as cheques, bills and the like. In this field of the technique, a system is known for magnetically reading characters printed on the lowest edge of cheques, the characters being transferred into the memory of one single computer unit connected with, but physically separated from the magnetic readers; such a computer unit, by a suitable software, controls a number of physically separated devices for selecting the cheques according to common characteristics, i.e. amount less or more than a given value, place of issue, etc.

In the known system a number of breakdowns can occur, for example the single computer unit which gathers a lot of data from the magnetic readers and controls a plurality of selecting devices, it can be too slow in operation, due to the great amount of data to be handled.

Furthermore, the electrical connections among the computer unit, magnetic readers and selecting devices can receive noise signals which produce operation failures with heavy consequences in operation.

A damage of the computer unit gives rise to the stop of all devices connected therewith. Yet the known system is too big sized to be used in a single employee's work place, like counter windows in a bank.

SUMMARY OF THE INVENTION

This invention aims at realizing an apparatus and a corresponding process for reading and selecting documents, which overcomes the above-mentioned breakdowns.

A first subject of this invention is an apparatus for magnetically or optically reading documents and selecting the same comprising a microprocessor to carry out said reading and selecting, and further comprising:

a belt guided by at least a driving cylinder and idle rollers to form a closed, continuous path having a U-shape, the cylinder and rollers rotating around their vertical axes, at least a slot suitable to contain the documents and located in front of each end of the U-shaped path, a selector movable around a vertical axis, said selector being positioned between an end of said U-shaped path and one of said slots.

A further subject of this invention is a process for magnetically or optically reading documents and selecting the same comprising the steps of magnetizing given characters printed on the documents, reading them by a proper device and sending them to a memory of a computer unit which, according to a software, provides control of a number of devices for sending the documents into a given mail-box having a slot shape, wherein the process comprises the further steps of:

bringing the document into a sending slot, moving the document from the sending slot to a driving cylinder for magnetizing and reading the characters on the document, rotating a selector in a given position to form a passage from the driving cylinder and a receiving slot, and sending the document to the receiving slot.

BRIEF DESCRIPTION OF THE DRAWINGS

Other characteristics and further advantages will be apparent from the following detailed description of a preferred embodiment of the apparatus and process, based on the enclosed drawings, in which.

DETAILED DESCRIPTION OF THE PREFERRED EMBODIMENTS

Figure 1:
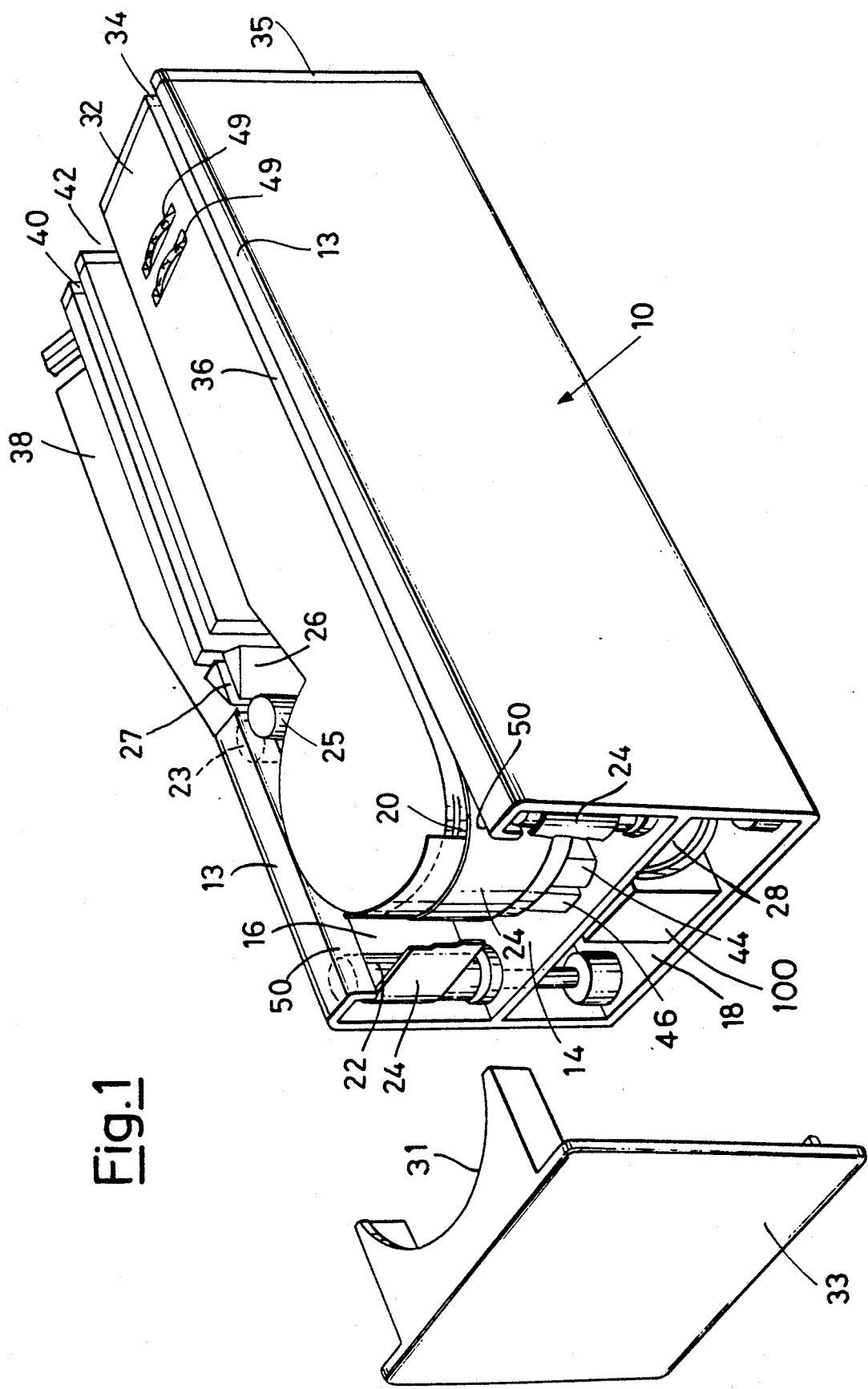
FIG. 1 is a perspective view, partially cutaway, of the apparatus according to the present invention.

Although the following description will be referred to cheques, it will be appreciated that the embodiments of the apparatus and process, according to the present invention, can be applied even to the handling of other kinds of documents.

With reference to the FIGS. 1, 2, 3, 4, the apparatus shows a covering 10 having the longitudinal edges 13 that are folded towards the interior of the covering. The interior of the covering 10 is divided into two chambers 16,18 by a horizontal plate 14 (see also FIG. 3); the chamber 18 is located under the chamber 16.

In the chamber 18 there are a number of components including a computer unit 100 and other electronic devices; as the structures of such components and devices are not regarded as parts of this invention, their detailed description will be omitted.

Figure 2:
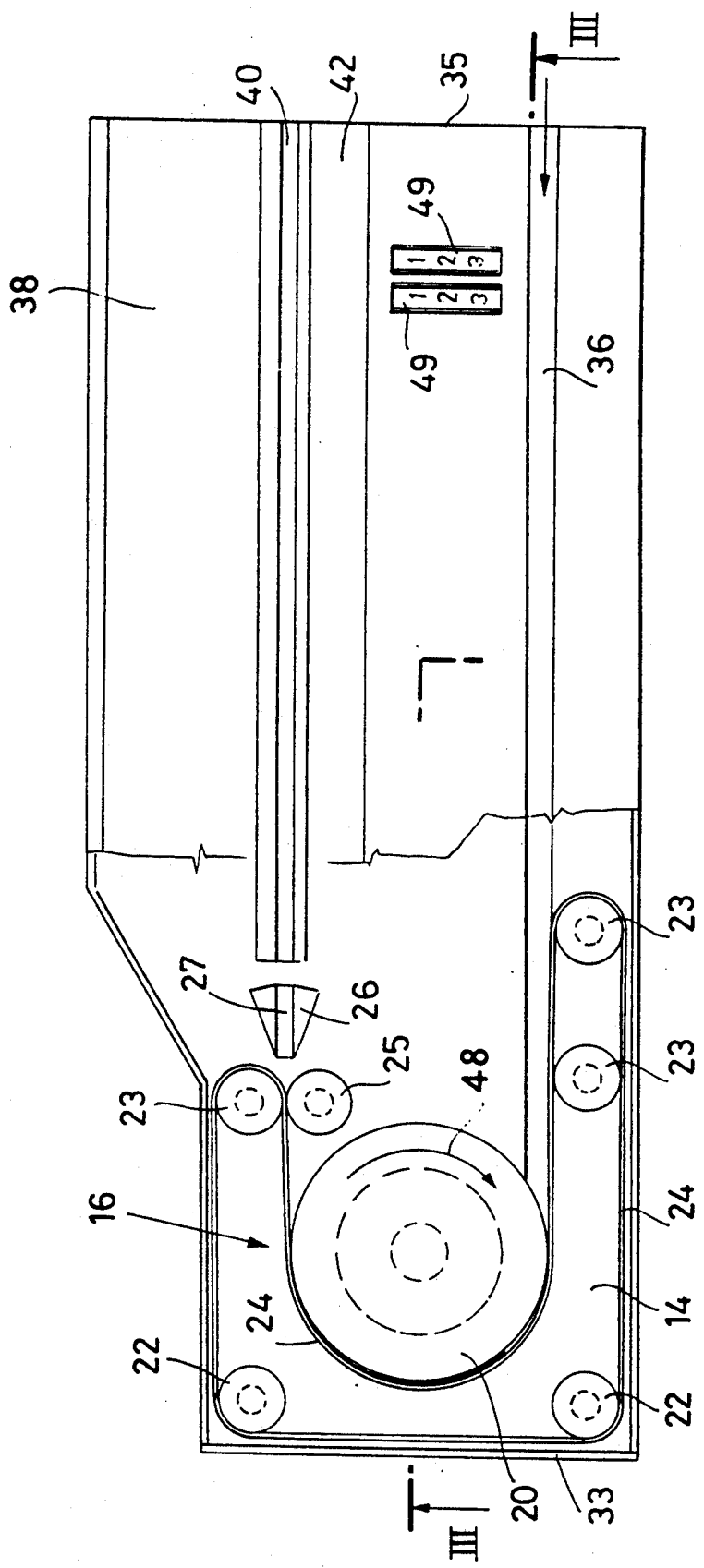
FIG. 2 is a plan view, partially cutaway, of the apparatus of FIG. 1.
Figure 3:
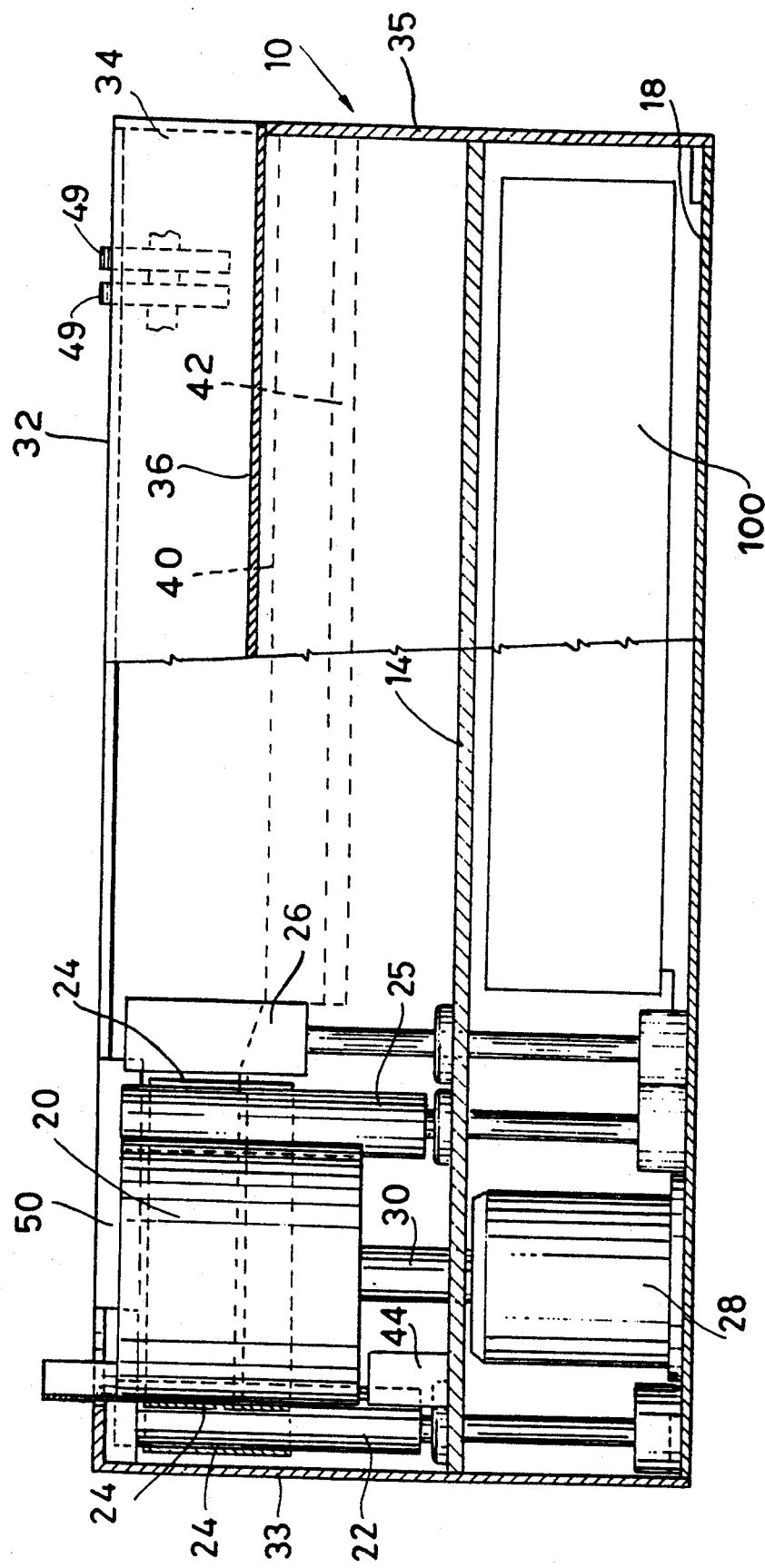
FIG. 3 is a view of the apparatus of FIG. 2 cut along the plane III—III.

On the plate 14, near one of its ends, there are a driving cylinder 20 and idle rollers 22,23, all rotating around their vertical axes, the idle rollers being dragged by the belt 24; the cylinder and the rollers are arranged in such a way that the belt 24 around through them, forms a closed, continuous path having a U-shape (see FIG. 2).

More in detail, two idle rollers 22 are located at each corner of the end of the covering 10, while three idle rollers 23 are arranged near the walls of the covering, the driving cylinder 20 is placed in the area among the idle rollers.

A check can be engaged between the belt 24 and the driving cylinder 20, therefore it turns around the cylinder in the direction of the arrow 48 and leaves the belt 24 at the opposite side to enter between the idle rollers 23, 25 to be guided towards a selector 26. The selector 26 is placed in front of the couple of rollers 23, 25, it is movable around a vertical axis, and it has a longitudinal slit 27 for conveying the check forward.

The cylinder 20 is moved by a motor 28 through shaft 30 (see FIG. 3); the motor 28 can be a stepping motor and can be located in the chamber 18 under the cylinder 20. A shaped element 32 is on the driving cylinder 20 and extends as far as the length of the covering 10, to form with it a slot 36.

An end wall 33 closes the covering 10 on the side where the cylinder 20 is arranged, the wall 33 has a projection whose shape defines, with the cylinder, an interstice 31 for passing of the check.

Figure 4:
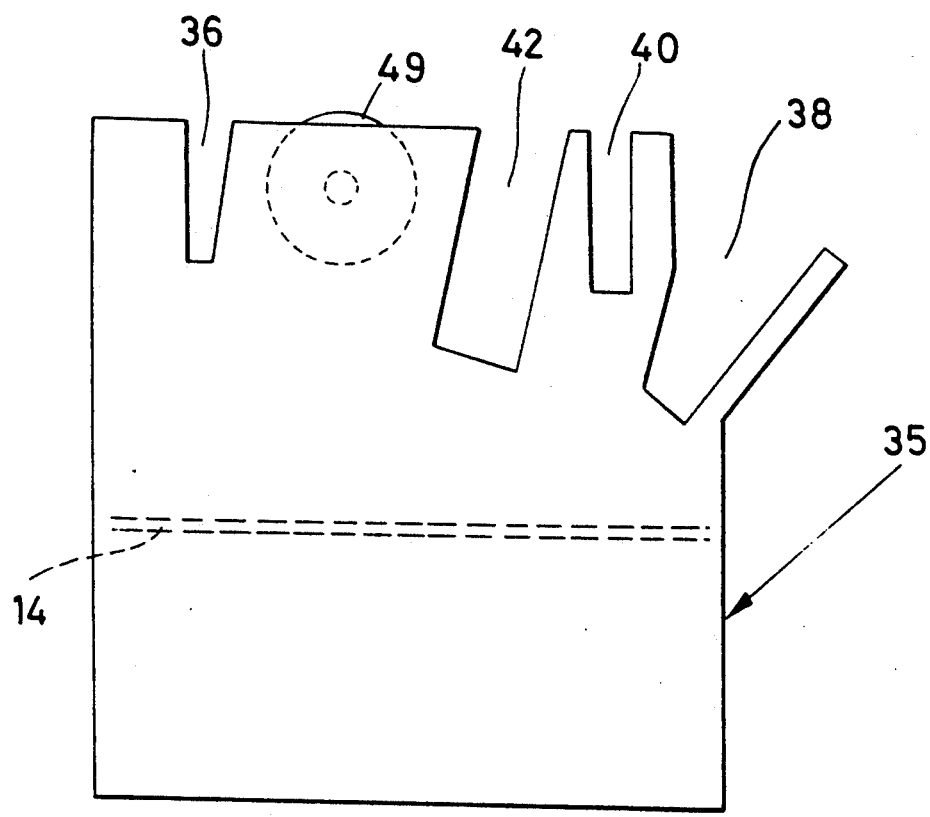
FIG. 4 is a front view of an end of the apparatus of FIG. 1 showing the shape of the slots.

A second end wall 35 closes the covering 10 on the opposite side; this wall has a particular shape shown at FIG. 4, with apertures 36, 38, 40, 42 corresponding respectively to the slots 36, 38, 40, 42 of the apparatus shown in FIG. 1.

In front of the selector 26 at the opposite side of the couple of the idle rollers 23, 25 are positioned three slots 38, 40, 42 substantially parallel to each other and to the longitudinal edge 13 of the covering 10.

The slot 38 has a cross-section large enough to receive the most of the checks selected, and it has a shape for easily taking the checks from.

As shown in FIG. 4, the laterally outermost wall of the slot 38 is inclined towards the exterior, while the opposite wall has two parts; the outer one upright, the inner one inclined towards the exterior; the bottom of the slot 38 is flat and perpendicular to the laterally outermost wall.

The slot 40 has a substantially rectangular cross-section having width and depth smaller than those of the slot 38, because it has to receive a smaller quantity of checks. The slot 42 also has a substantially rectangular cross-section, but inclined in respect of a vertical line; the slot 42 has a smaller width than that of the slot 38 and depth as that of the slot 38.

The slot 36 has a cross-section like that of the slot 40 with a wall slightly inclined in respect of the vertical line.

Although the slots and apertures have been described in the preferred embodiment of FIGS. 1 and 4, it will be apparent that the shape of said slots and apertures can be changed, according to the task they have to comply with. Under the driving cylinder 20, fixed on the plate 14, in the chamber 16 there is a magnetic head 44 and a reader head 46, the outermost surfaces of the heads being practically in contact with the check when passing around the cylinder, dragged by the belt 24.

The tension of the belt 24 can be adjusted by shifting the rollers 23 and/or by using an elastic belt.

The operations of the apparatus, according to the above embodiment, are explained herebelow.

The check to be selected is put in the sending slot 36 and pushed forward, a photoelectric cell (not shown) detects the presence of the check and activates a device (not shown) to press the check against the belt 24 and to start the stepping motor 28. The stepping motor, through the shaft 30, moves the cylinder 20 which drags the belt 24 along a path having a U-shape with the idle rollers 22, 23. The check is engaged by the belt 24 and turns around the cylinder 20 in the direction of the arrow 48; the heads 44 and 46 respectively magnetize and read the characters printed on the check and sends them to the computer unit 100; when all characters are read, the motor 28 stops.

During the above operations the front edge of the check enters the longitudinal slit 27 of the selector 26 and reaches the slot 40 to hold a portion of it. Then the computer unit decides in which receiving slot the check is to be put down, by means of a suitable software, i.e. selected by the selecting device 49. The computer unit 100 starts the stepping motor 28 to let the driving cylinder 20 rotate in the opposite direction of the arrow 48 to retract the check from the slit 27 of the selector 26, therefore the computer unit orders an angular displacement of the selector 26, so that the slit 27 is aligned with the selected receiving slot, i.e. the slot 38. The rotation of the driving cylinder 20 is then inverted for sending the check, through the slit 27, in the selected slot.

The above process can be simplified, according to the operations described herebelow to which the apparatus is to be adapted by slight modifications.

The check to be selected is put into the sending slot 40, which in the circumstance may have the shape of the slot 36 of FIG. 4, the check is pushed forward, a photoelectric cell (not shown) detects the presence of the check and activates a device (not shown) to press the check against the belt 24 and to start the stepping motor 28.

The stepping motor, through the shaft 30, moves the cylinder 20 which drags the belt 24 along a path having a U-shape with the idle rollers 22, 23.

The check passes through the slit 27 of the selector 26, is engaged by the belt 24 between the rollers 23, 25 in front of the selector 26, the check turns around the cylinder 20 in the opposite direction of the arrow 48 (FIG. 2); the heads 44 and 46 respectively magnetize and read the characters printed on the check (in the circumstance the position of the heads 44 and 46 will be inverted in respect of that shown in FIG. 1). The data corresponding to the characters read by head 46 are sent to the computer unit 100, when all characters are, read, the motor 28 stops.

During the execution of the above operations, the front edge of the check enters the slot 36 to hold a portion of it, while the rear edge of the check is between the cylinder 20 and the belt 24, so that the slit 27 is completely free from the check. As in the first process, the computer unit 100 decides in which receiving slot the check is to be put down by means of a suitable software. If the receiving slot is 38 or 42 (FIG. 1), then the computer unit 100 orders an angular displacement of the selector 26, so that the slit 27 is aligned with the selected receiving slot 38 or 42; the computer unit starts the stepping motor 28 to let the driving cylinder 20 rotate in the direction of the arrow 48 for sending the check through the slit 27 in the selected slots 38 or 42.

If the selected receiving slot is 36, then the computer unit 100 simply starts the stepping motor 28 to let the driving cylinder 20 rotate in the opposite direction of the arrow 48 for sending the check into the slot 36.

It will be appreciated that in the first process the check travels three times around the cylinder 20, while in the second process the check travels only twice or even once around the cylinder 20, so that the second process should be more speedy.

Figure 5:
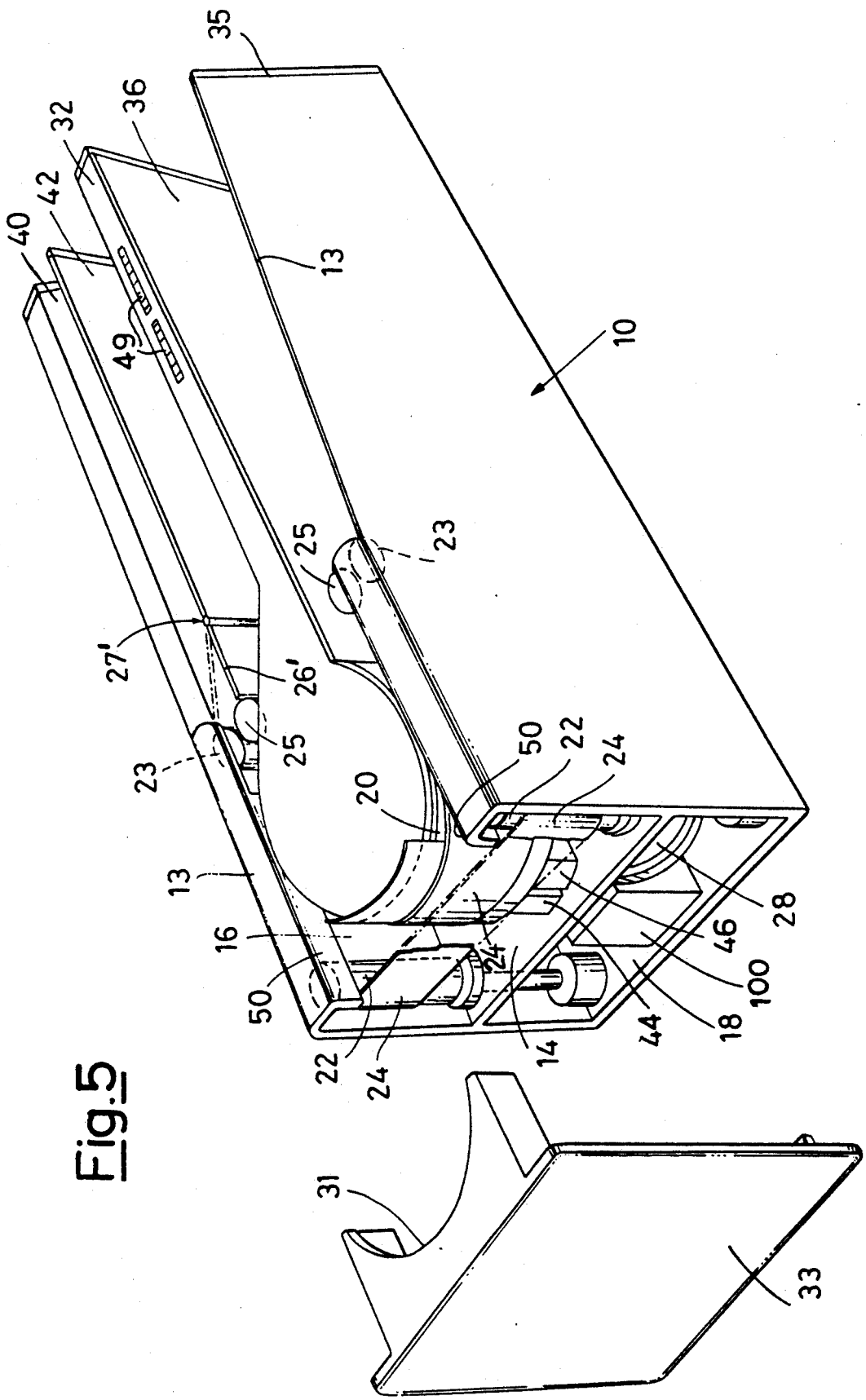
FIG. 5 is a perspective view, partially cutaway, of the apparatus according to a further preferred embodiment, according to this invention.
Figures 6, 7:
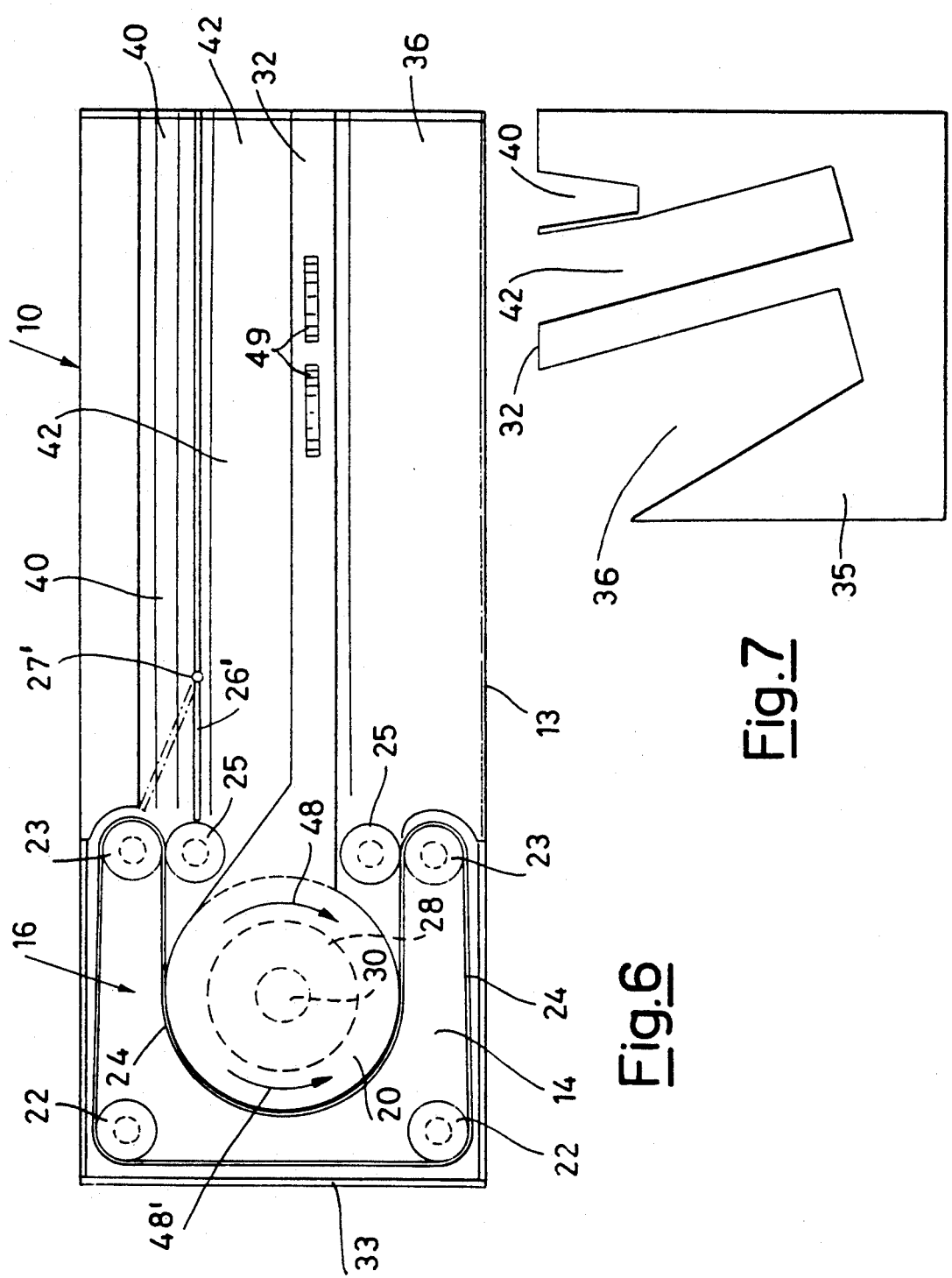
FIG. 6 is a plan view, partially cutaway, of the apparatus of FIG. 5.
FIG. 7 is a front view of an end of the apparatus of FIG. 5 showing the shape of the slots.

The FIGS. 5, 6 and 7 show another embodiment of this invention; in which the numerical references are the same for corresponding elements of FIGS. 1, 2 and 4. As it will be apparent in FIGS. 5 and 6, the selector 26, having the slit 27 of FIGS. 1 and 2, has been substituted by the deflector 26', constituted by a flat plate of magnetizable metal rotating around a vertical axis or hinge 27'.

The deflector 26' is moved by an electromagnetic device (not shown) controlled by the computer unit 100 for opening/closing the passage between the slots 40 or 42 and the couple of idle rollers 23, 25 in front of said slots.

A hinge 27' is positioned at the end of the wall dividing the slots 40 and 42 on the side of the driving cylinder 20.

The slot 38 of the FIGS. 1 and 4 has been eliminated, with the advantage to furthermore reduce the size of the apparatus, accordingly the measures and shapes of the remaining three slots 36, 40, 42 of the FIGS. 5 and 7 have been modified in respect of the corresponding slots shown in the FIGS. 1 and 4.

In particular, the slots 36 and 42 of the FIGS. 5 and 7 are normally "receiving slots", while the slot 40 is a "sending/receiving slot", as it will be better explained hereinafter. The other modifications shown in the FIGS. 5, 6 and 7 in respect of the FIGS. 1, 2 and 4 are merely of construction nature, and they have no relevance on the inventive concept: i.e. the shaped element 32 is narrower, the selecting devices 49 are aligned one to the other instead to be side by side disposed, one of the rollers 23 has been eliminated, and a second couple of idle rollers 23, 25 has been added.

The operations of the apparatus, according to the embodiment shown in the FIGS. 5, 6 and 7, are explained herebelow.

The check to be selected is put into the slot 40 and then pushed forward; a photoelectric cell (not shown) detects the presence of the check and activates a device (not shown) to press the check against the belt 24 through the opening of the deflector 26 and to start the stepping motor 28.

The stepping motor, through the shaft 30, moves the cylinder 20 which drags the belt 24 along the path having a U-shape with the couples of rollers 23, 25 and the rollers 22. The check turns around the cylinder 20 in the direction of the arrow 48' (FIG. 6): the heads 44 and 46 respectively magnetize and read the characters printed on the check; the data corresponding to the characters read by 46 are sent to the computer unit; when all characters are read, the motor 28 stops.

During the execution of the above operations, the front edge of the check enters the slot 36 to hold a portion of it, while the rear edge of the check is between the cylinder 20 and the belt 24 leaving the deflector 26' free from the check. Then the computer unit decides in which receiving slot the check is to be put down by means of a suitable software.

If the selected receiving slot is 36, then the computer unit simply starts the stepping motor 28 to let the driving cylinder 20 rotate in the direction of the arrow 48' for sending the check into the slot 36.

If the selected receiving slot is 42, then the computer unit orders an angular displacement of the deflector 26' around the hinge 27' to open a passage towards the slot 42 and to close the passage towards the slot 40.

The computer unit starts the stepping motor 28 to let the driving cylinder 20 rotate in the direction of the arrow 48 for sending the check into the slot 42.

If the selected receiving slot is 40 (in the circumstance slot 40 is both a sending and a receiving slot), then the computer unit orders the deflector 26' to close the passage towards the slot 42 and to open the passage towards the slot 40 for sending the cheque therein.

Although the above description is referred to preferred embodiments of the apparatus and process to select a document, it is clear that various changes could be applied to the apparatus and/or the process without departing from the basic concept of this invention.

I claim:

1. An apparatus for reading documents and selecting the same, comprising means for providing and reading data on said documents, means for selecting documents, a microprocessor for controlling said reading and selecting means, a belt (24) guided by at least a driving cylinder (20) and idle rollers (22, 23) to form a closed, continuous path of U-shape, the cylinder and rollers rotating around their vertical axes, an elongated feeding slot terminated at one end of said path to feed documents to said path, at least two elongated receiving slots (38, 40) for receiving the documents and each having an entry, an additional roller (25) positioned with one of said idle rollers at another end of said path to receive each document through a gap formed between said additional roller and said one of said idle rollers, said selecting means including a single selector (26) movable about a vertical axis thereof, said selector being positioned adjacent said gap so that each document leaving said gap is received at said selector, said selector being controlled by said microprocessor to angularly move between one position to align said gap to the entry of one of said receiving slots and another position to align said gap with the entry of another of said receiving slots.

2. Apparatus according to claim 1, and further comprising control means for rotating the driving cylinder around its axis and dragging said belt, said control means including a stepping motor (28).

3. Apparatus according to claim 1, wherein the feeding slot is associated with a control device to activate the stepping motor.

4. Apparatus according to claim 1, wherein said feeding slot has width and depth smaller than those of the receiving slots.

5. Apparatus according to claim 1, wherein the selector has a longitudinal slit (27) for receiving documents therethrough and conveying the documents from said gap to one of said receiving slots.

6. Apparatus according to claim 1, wherein said selector is a door (26') rotating around a hinge (27').

7. Apparatus according to claim 1, wherein said selector is rotated to a given position by an electromagnetic device controlled by said microprocessor connected with said reading means (46).

8. Apparatus according to claim 7, wherein said reading means is arranged under the driving cylinder.

9. Apparatus according to claim 7, wherein said microprocessor is housed in a chamber (18) under the driving cylinder.

10. An apparatus for magnetically or optically reading documents and selecting the same, comprising means for providing and reading data on said documents, means for selecting documents, a computer unit for controlling said reading and selecting means, a belt (24) guided by at least a driving cylinder (20) and idle rollers (22, 23) to form a closed, continuous path of a U-shape in a horizontal plane, the cylinder and rollers rotating around their vertical axes, an elongated horizontally extending feeding slot terminated at one end of said path to feed documents thereto, at least two horizontally extending elongated receiving slots (38, 40) for receiving the documents and each having an entry, an additional roller positioned with one of said idle rollers at another end of said path to receive each document through a gap formed between said additional roller and said one of said idle rollers, and said selecting means including a single selector (26) rotatable about a vertical axis thereof, said selector being positioned adjacent said gap and including a slit for receiving a document from said gap and passing the document to the entry of one of said receiving slots, said selector being controlled by said computer unit to angularly move between one position in which said slit is in alignment with one of said receiving slots and another position in which said slit is in alignment with another of said receiving slots to pass a selected document from said gap into a respective receiving slot.

11. In a process for magnetically or optically reading documents and selecting the same, comprising the steps of magnetizing given characters printed on the documents, reading them by reading means and sending them to a computer unit which provides control of devices for sending the documents into a given mail-box having a slot shape, the improvement comprising:

bringing the documents into an elongated feeding slot, moving the documents from the feeding slot to magnetizing and reading means provided at a driving cylinder for magnetizing and reading given characters on the documents, providing idle rollers receiving each document from said driving cylinder through a gap therebetween, providing selector adjacent said idle rollers, said selector being controlled by said computer unit and having a slit for receiving each document therethrough, rotating said selector to a given position so as to align said slit with one of at least two receiving slots to form a passage from said gap and one of said two receiving slots, and sending the document to a respective receiving slot.

* * * * *